United States Patent [19]

Kaschemekat et al.

[11] Patent Number: 5,069,793
[45] Date of Patent: Dec. 3, 1991

[54] MEMBRANE MODULE

[75] Inventors: Jurgen Kaschemekat; Richard W. Baker, both of Palo Alto; Johannes G. Wijmans, Menlo Park, all of Calif.

[73] Assignee: Membrane Technology & Research, Inc., Menlo Park, Calif.

[21] Appl. No.: 582,746

[22] Filed: Sep. 12, 1990

[51] Int. Cl.$^5$ ............................................. B01D 61/36
[52] U.S. Cl. .................................. 210/640; 210/247; 210/34.83
[58] Field of Search .................. 210/640, 247, 34.74, 210/34.83, 494.1, 497.1

[56] References Cited

U.S. PATENT DOCUMENTS

| | | | |
|---|---|---|---|
| 3,367,504 | 2/1968 | Westmorland | 210/321 |
| 3,386,583 | 6/1968 | Merten | 210/321 |
| 4,083,780 | 4/1978 | Call | 210/23 |
| 4,137,113 | 1/1979 | Kanamaru et al. | 156/187 |
| 4,243,701 | 1/1981 | Riley et al. | 427/244 |
| 4,476,022 | 10/1984 | Doll | 210/21.5 |
| 4,500,426 | 2/1985 | Ishii et al. | 210/321.3 |
| 4,553,983 | 11/1985 | Baker | 55/16 |
| 4,735,717 | 4/1988 | Sims | 210/247 |
| 4,789,480 | 12/1988 | Brüschke | 210/640 |
| 4,792,401 | 12/1988 | Truex et al. | 210/644 |
| 4,802,982 | 2/1989 | Lien | 210/247 |
| 4,834,881 | 5/1989 | Sawada et al. | 210/321.74 |
| 4,842,736 | 6/1989 | Bray et al. | 210/321.61 |
| 4,855,058 | 8/1989 | Holland et al. | 210/321.87 X |
| 4,861,487 | 8/1989 | Fulk, Jr. | 210/644 |
| 4,906,256 | 3/1990 | Baker et al. | 55/16 |

OTHER PUBLICATIONS

"Development and Demonstration of a Spiral-Wound Thin-Film Composite Membrane System for the Economical Production of Oxygen-Enriched Air," L. J. Burnett et al, U.S. Dept. of Energy Report No. DE 84002918, pp. 41-50.
"Reverse Osmosis and Synthesis Membranes", pp. 371-385, S. S. Kremen, Ed. S. Sourirajan, National Research Council Canada (1977) NRCC No. 15627.
"The Separation of Dissolved Organics from Water by Pervaporation", I. Blume, J. Wijmans, R. Baker, Journal of Membrane Science 49, 253-286, (1990).

Primary Examiner—Frank Spear
Attorney, Agent, or Firm—J. Farrant

[57] ABSTRACT

A spiral-wound pervaporation module, designed to achieve optimum permeate flow throughput. The module is of conventional design and construction, in that it incorporates membrane envelopes, within and between which are channels through which the feed and permeate streams flow. The feed and permeate channels are created by spacers on the feed and permeate sides of the membrane layers. The module is unconventional in that the permeate spacer is tailored for optimum permeate flow throughput. The tailoring is based on the discovery that the total permeate flow throughput from a module passes through a maximum as the resistance to vapor transport of the permeate spacer material is progressively decreased. The resistance to vapor transport along the permeate channel is kept below a value at which it has a significant adverse effect on the membrane flux and the membrane separation properties, yet at the same time the total module throughput is within an optimum range.

When modules in accordance with the invention are made, the increase in throughput per unit membrane area that is obtained more than compensates for the loss in membrane area brought about as a result of the use of a thicker permeate spacer. The modules are particularly advantageous for containing high-flux, high-separation membranes, and for low-pressure pervaporization processes.

43 Claims, 7 Drawing Sheets

MEMBRANE MODULE

FIELD OF THE INVENTION

The invention relates to membrane modules used for liquid separations. More particularly, the invention relates to the use of spiral-wound modules for pervaporation.

BACKGROUND OF THE INVENTION

Pervaporation is a membrane-based process used to separate solutions on the basis of differences in the volatilities or diffusion characteristics of the components. A liquid mixture contacts one side of a membrane; the permeate is removed as a vapor from the other side. Transport through the membrane is induced by the difference in partial pressure between the liquid feed solution and the permeate vapor. This partial-pressure difference can be maintained in several ways, such as drawing a vacuum on the permeate side of the system, sweeping the permeate side with a carrier gas, or simply cooling the permeate vapor, causing it to condense.

In any membrane process, the membranes must be packaged. Spiral-wound modules, developed for reverse osmosis and now used for reverse osmosis, ultrafiltration and some gas separation applications, are advantageous because they pack very large areas of membrane into a small volume. Spiral-wound modules work well in processes characterized by high pressure differentials between feed and permeate sides and low product flow volumes. Absent these process attributes, spiral-wound modules run into difficulties, because the inevitable pressure drop along the permeate channel diminishes the driving force available for membrane permeation. The lower the inherent transmembrane driving pressure, the worse this problem becomes. The worst scenario is encountered in processes characterized by a low driving pressure, but a relatively high permeate flow, particularly if the process relies on a high membrane separation factor between the components. In this case, the diminished transmembrane pressure differential resulting from the pressure drop along the permeate channel may not only ruin the flux, but may also spoil the separation properties. Unfortunately, pervaporation is just such a process. Modern pervaporation membranes offer separation factors in the 100s or more for organic components over water, for example, and have high permeate fluxes. Pervaporation is inherently a process that relies on a small difference in partial vapor pressure between the feed and permeate sides of the membrane, a difference that is often as little as 10 cmHg or less.

U.S. Pat. No. 4,789,480 described a spiral-wound pervaporation module in which the permeate channel pressure drop problem is addressed by using a radial-flow configuration. To date, the art has not been successful, to applicant's knowledge, in developing industrial pervaporation systems containing spiral-wound modules. The only successful industrial pervaporation installations use plate-and-frame modules, where the pressure drop problem is not an issue. GFT, of Neunkirchen, West Germany, has installed many pervaporation dehydration systems using this module technology.

SUMMARY OF THE INVENTION

The invention is an optimized throughput spiral-wound pervaporation module. The invention teaches how to make a spiral-wound pervaporation membrane module in such a way that the resistance to vapor transport along the permeate channel is kept below a value at which it has a significant adverse effect on the membrane flux and the membrane separation properties, yet at the same time the total module throughput is within an optimum range.

The module is of a conventional design and construction, as used for other membrane separation processes, in that it incorporates membrane envelopes, within and between which are channels through which the feed and permeate streams flow. The feed and permeate channels are created by spacers on the feed and permeate sides of the membrane layers.

The module is unconventional in that the permeate spacer is tailored for optimum module permeate throughput. The tailoring is based on our discovery that the total permeate flow throughput from a module passes through a maximum as the resistance to vapor transport of the permeate spacer material is progressively decreased. The capability of the permeate spacer material to transport permeating vapor from the membrane surface to the permeate collection pipe can be expressed as a normalized conductivity, or permeate vapor flow, per unit pressure drop in the permeate channel, per unit transmembrane flux. To achieve optimum performance from a module, this normalized conductivity should be within an optimum range. By optimum performance, we mean a permeate flow throughput at least a chosen percentage, such as 60%, 70%, 80% or 90%, of the maximum possible value. If the membrane, permeate spacer type and permeate channel length and width are fixed, the conductivity will vary with the spacer thickness, so the spacer thickness should be within an optimum range to achieve optimum throughput. We have discovered that graphs of module throughput versus spacer conductivity or spacer thickness can be made and used to determine the best spacer configuration for a given situation.

We have also discovered that, when modules in accordance with these principles are made, the separation performance remains good. Also, unexpectedly, the increase in throughput per unit membrane area that we obtain with optimized spacers more than compensates for the loss in membrane area that can be packed into a module as a result of the use of a thicker spacer.

The optimized module of the invention contains one or more membrane envelopes. The membranes themselves are preferably multilayer structures, including a very thin permselective layer, which performs the separation, coated onto a microporous support. Additional protective or sealing layers may be incorporated as necessary. Alternatively, the membrane may consist of a single asymmetric or homogeneous layer. A typical width for a membrane sheet is between about 6 inches and 40 inches. A typical length is 1–5 meters. To form the module, the membrane is folded across parallel to its short side, to form an envelope of length 0.5 to 2.5 meters. Spacers are used on the feed and permeate sides. To form the module, a sandwich of permeate spacer, membrane, feed spacer, membrane is coiled in a spiral around a central permeate collection pipe. The feed spacer defines the channel through which the feedstream flows, and the material chosen can be a very open polymer mesh.

The permeate spacers are preferably made from net or other porous materials of a sufficient thickness and mesh size to form an open pathway for permeate removal from the membrane surface. The permeate channel should be as short as possible, consistent with manufacturing capabilities. One way to make the channel down which the permeate vapor has to flow short is to use multiple membrane envelopes. When the spacer type and channel dimensions are known, the optimum permeate spacer for use with any given membrane can be established by plotting a graph of total permeate flow throughput against thickness. The permeate spacer used is then chosen so that the permeate throughput is within any desired percentage of the maximum value established by the graph, such as 60%, 70%, 80% or 90%. The permeate spacer may be a single layer, or may be made up of multiple layers superposed, the individual layers being the same or different.

The modules can be used for separating one or more components of a feed liquid by pervaporation. Examples of liquid separations via pervaporation where the modules are useful include removal of chlorinated or fluorinated solvents from wastewater, recovery of flavor essences from evaporator condensate streams, removal of organics from water, removal of water from organics, or separation of one organic component from another, such as the separation of methanol from MTBE/butene mixtures, or the separation of propane from propene. The modules are particularly advantageous for situations in which a high-performance membrane, in other words a membrane exhibiting high permeate flux and high separation factor or selectivity, is used.

The modules of the invention are preferably used by running the feedstream to be treated over the feed side of the membrane, so that the feed flows axially down the module from end to end. The permeating components enter the permeate channel and are drawn spirally inward to the central collection pipe, through which the permeate stream exits the module.

It is an object of the invention to provide spiral-wound pervaporation modules with optimized permeate flow throughput.

It is an object of the invention to provide spiral-wound pervaporation modules having permeate spacer materials with conductivity to achieve optimimum permeate flow throughput.

It is an object of the invention to provide spiral-wound pervaporation modules in which the pressure drop along the permeate channel is small compared with the partial pressure difference between the feed and permeate sides of the membrane.

It is an object of the invention to provide high-performance modules for use in pervaporation.

It is an object of the invention to provide pervaporation modules that can be used for membranes exhibiting a permeate vapor flux of 100 L(STP)/m$^2$.h or greater.

It is an object of the invention to provide pervaporation modules that can be used with membranes exhibiting a membrane selectivity, expressed as the ratio of the membrane permeabilities of a faster permeating component to a slower permeating component, greater than 2.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

The invention is a spiral-wound membrane module, with optimized permeate flow throughput, for use in pervaporation.

Pervaporation is a low-pressure membrane process that can be used to separate components of differing volatilities from solutions. A permselective membrane, selectively permeable to at least one component of the feed solution, performs the separation. In a pervaporation system, the feed solution is introduced into an array of membrane modules. One or more of the feed liquid components pass through the membrane and are withdrawn in vapor form on the permeate side. The non-permeating fraction is removed as a liquid residue.

A convenient mathematical method of describing pervaporation is to divide the separation into two steps. The first is evaporation of the feed liquid to form a (hypothetical) saturated vapor phase on the feed side of the membrane. The second is permeation of this vapor through the membrane to the low pressure permeate side of the membrane. Although no evaporation actually takes place on the feed side of the membrane during pervaporation, this approach is mathematically simple and is thermodynamically completely equivalent to the physical process. This model reflects the fact that the separation factor, $\beta_{pervap}$, achieved by a pervaporation process is the product of the separation achieved by evaporation of the liquid, $\beta_{evap}$, and the separation achieved by permeation of the components through the membrane, $\beta_{mem}$. The term $\beta_{mem}$ depends on the selectivity of the membrane, $\alpha_{mem}$, where $\alpha_{mem}$ is the ratio of the membrane permeabilities of a faster permeating component to a slower permeating component. The term $\beta_{mem}$ also depends on the partial vapor pressures of the components on the feed and permeate sides.

Transport through the membrane is induced by the difference in partial pressure between the liquid feed solution and the permeate vapor. This partial-pressure difference can be maintained in several ways, such as drawing a vacuum on the permeate side of the system, or cooling the permeate vapor, causing it to condense. The feed liquid may also be heated. The components of the feed solution permeate the membrane at rates determined by their feed solution vapor pressures, that is, their relative volatilities, and by their intrinsic permeabilities through the membrane.

The separation factor, $\beta_{pervap}$, can be written as $$\beta_{pervap} = \frac{c''_1/c''_2}{c'_1/c'_2}, \tag{1}$$

where $c'_1$ and $c'_2$ are the concentrations of components 1 and 2 on the feed liquid side and $c''_1$ and $c''_2$ are the concentrations of components 1 and 2 on the permeate side of the membrane. Because the permeate is a vapor, $c''_1$ and $c''_2$ can be replaced by $p''_1$ and $p''_2$, the vapor pressures of components 1 and 2 on the permeate side of the membrane. The separation achieved can then be expressed by the equation $$\beta_{pervap} = \frac{p''_1/p''_2}{c'_1/c'_2}. \tag{2}$$

On the feed side of the membrane, the partial pressure is the vapor pressure of the species in equilibrium with the liquid feed at the temperature of the feed liquid. On the permeate side of the membrane, the partial pressure is determined by the temperature of the condenser and the pressure drop along the channel through which the permeate vapor is conveyed away from the membrane surface to the condenser.

Two factors in combination influence the performance of a membrane module: the intrinsic flux and separation capabilities of the membrane, combined with the resistance to vapor flow presented by the permeate channel. The resistance to flow is manifested as a pressure drop along the permeate channel, and depends on the spacer porosity, the channel length and the spacer thickness.

The importance to transmembrane flux of the low pressure that can be maintained at the membrane surface on the permeate side, and the adverse effects that arise from a substantial difference in pressure between the permeate side membrane surface and the condenser, can be understood using some representative numbers. An aqueous feed solution at a temperature of 50° C. would have a water vapor pressure of 9.2 cmHg. If the permeate vapor leaving the module were passed to a condenser at a temperature of 5° C., the water vapor pressure at this point would be 0.6 cmHg. The maximum possible vapor pressure difference between the feed and permeate sides of the membrane would, therefore, be 8.6 cmHg. Using high-performance membranes, a transmembrane liquid water flux of 0.1-2 kg/m².h, equal to a vapor flow of 130-2,600 L(STP)/m².h, could be achieved with this pressure drop. However, a pressure gradient is required to move this vapor from the permeate side of the membrane through the permeate spacer material out of the module and to the condenser. The bulk of this pressure drop will occur in the small permeate spacer channels. If this pressure drop is only 1 cmHg, then the pressure on the permeate side of the membrane will be 1.6 cmHg, so that the driving force for membrane permeation is reduced to 7.6 cmHg. There will be a corresponding reduction in transmembrane flux of about 12%. If the pressure drop in the permeate spacer is 5 cmHg, the transmembrane pressure drop will fall to 3.6 cmHg, and the transmembrane flux will be reduced by nearly 60%. Modern pervaporation membranes can achieve permeate fluxes such as 100 L (vapor)/m².h, 500 L (vapor)/m².h or 1,000 L (vapor)/m².h From the exemplary calculation above, it is clear that, to sustain the high-flux performance offered by modern thin-film composite membranes, a spacer that can convey the permeate away from the membrane with a very low pressure drop along the permeate channel is demanded.

In addition to the adverse effect on flux, the pressure drop along the permeate channel may also have a substantial effect on the separation performance of the system. This effect is discussed in a recent publication, "The Separation of Dissolved Organics from Water by Pervaporation", I. Blume et al., Journal of Membrane Science, Vol. 49, 253-286, April 1990. In brief, if the partial vapor pressures of components 1 and 2 of the feed liquid are $p'_1$ and $p'_2$ and the partial vapor pressures on the permeate side are $p''_1$ and $p''_2$, then the total pressures on feed and permeate sides are:

$$p' = p'_1 + p'_2 \tag{3}$$

$$p'' = p''_1 + p''_2 \tag{4}$$

The percentages of component 1 in the vapor phase on the feed and permeate sides are $x'_1 = p'_1/p'$ and $x''_1 = p''_1/p''$. For a flow of component to occur across the membrane to the permeate side, there must be a vapor pressure drop across the membrane $$p'_1 \geq p''_1 \tag{5}$$

Dividing both side of the inequality, it follows that $$\frac{p'_1}{p'p''} \geq \frac{p''_1}{p'p''} \tag{6}$$

or $$\frac{x'_1}{p''} \geq \frac{x''_1}{p'} \tag{7}$$

Thus, even if the membrane is infinitely selective, the maximum permeate enrichment that can be achieved is limited by $$x''_1 \leq \frac{p'}{p''} \cdot x'_1 \tag{8}$$

The term $p'/p''$ is the ratio of the total feed pressure to total permeate pressure, called the pressure ratio, $\Phi$. Thus the permeate vapor concentration can never exceed $\Phi$ times the hypothetical feed vapor concentration.

In pervaporation, changing the hydrostatic pressure of the feed liquid has very little effect on the vapor pressure of the components on the feed side. It is often difficult, therefore, to achieve a large pressure ratio in pervaporation systems. The feed/permeate pressure ratio in industrial units may be as low as 10, 5 or even 2. In the water vapor example above, if the total feed pressure were 9.2 cmHg and the total permeate pressure were 0.6 cmHg, the pressure ratio would be 15.3. If the permeate pressure were 1.6 cmHg (1 cmHg drop down the permeate channel), the pressure ratio would fall to 5.8, and if the permeate pressure were 5.6 cmHg (5 cmHg drop down the permeate channel), the pressure ratio would fall to 1.6.

The limitation of Expression 8 is therefore, imporatant in pervaporation processes, because the pressure ratio can be much smaller than the intrinsic membrane selectivity, $\alpha_{mem}$. In these cases, the separation achieved by the process will be limited by the pressure ratio, rather than the intrinsic permselective properties of the membrane. The need to minimize permeate channel pressure drops on the permeate side then becomes more important. For many, if not most, pervaporation operations, a large pressure drop along the permeate channel has the potential to destroy the separation properties as well as the flux. This effect is demonstrated in Example 10, for the separation of ethyl acetate/water mixtures and Example 9 for ethanol/water mixtures.

Figure 1:
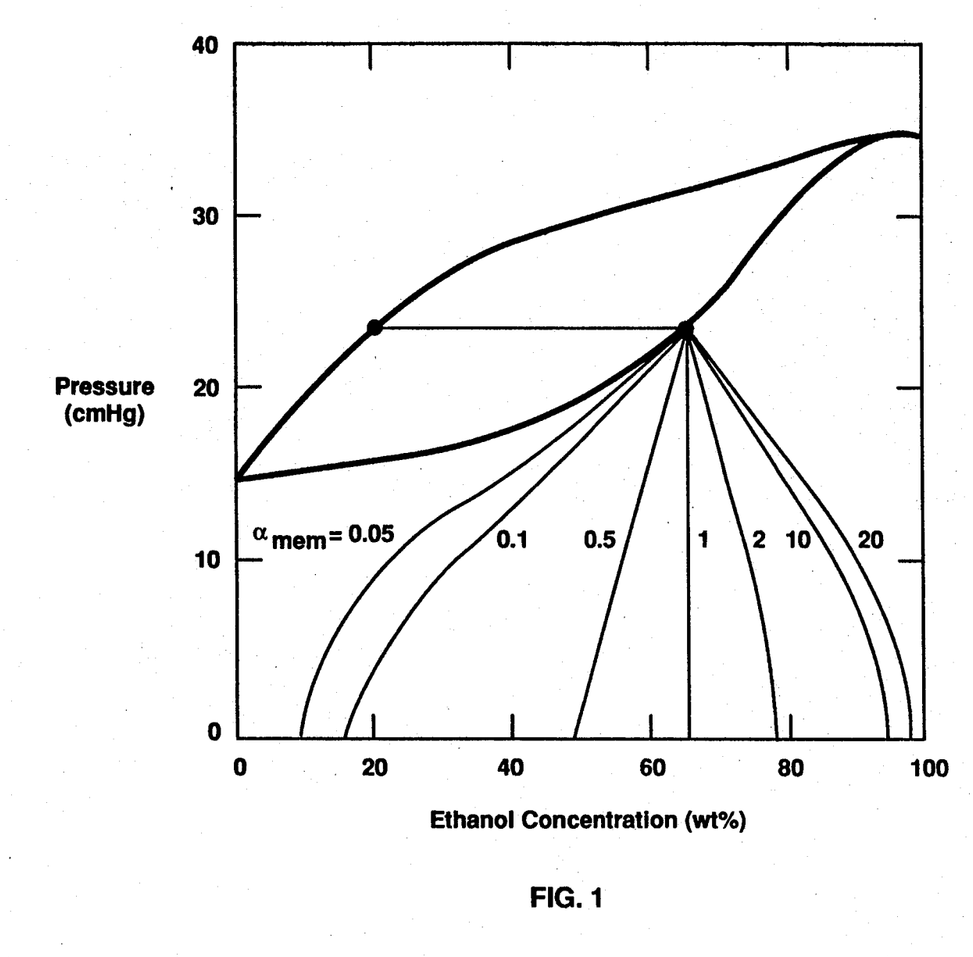
FIG. 1 is a graph of calculated permeate pressure versus permeate concentration curves for pervaporative separation of a feed liquid containing 20% ethanol in water.

The adverse effect of permeate channel pressure drop on separation becomes increasingly important the higher the membrane selectivity, $\alpha_{mem}$. It is possible to calculate the relationship between permeate concentration and pressure ratio based on the solution/diffusion model of membrane permeation. Such calculations are shown and discussed, for example, in U.S. Pat. No. 4,906,256, incorporated herein by reference, and the Blume et al. article. FIG. 1 is a graph of calculated permeate pressure versus permeate concentration curves for a feed liquid containing 20% ethanol in water. Referring now to this figure, the feed liquid is in equilibrium with a vapor phase containing approximately 65% ethanol. Absent a membrane, in other words relying only on evaporation to separate the components, or using a membrane with no selectivity for ethanol over water ($\alpha_{mem}=1$), the evaporate concentration is always 65% ethanol, regardless of permeate pressure or pressure ratio. This is indicated by the line in the vapor phase parallel to the pressure axis. The curves to the right of this line show the permeate concentration achieved by pervaporation using ethanol-selective membranes ($\alpha_{mem}=2$, 10 or 20).

For membranes with $\alpha_{mem}=2$, the effect of pressure ratio on performance is relatively slight. With a permeate pressure of 10 cmHg, the pressure ratio is 2.3 (23/10) and an ethanol permeate concentration of about 75% can be achieved. With a pressure ratio of 10 (permeate pressure 2.3 cmHg) the ethanol permeate concentration only increases to about 78-79%.

For membranes with $\alpha_{mem}=20$, on the other hand, the effect of pressure ratio is very important. A pressure ratio of 2.3 (permeate pressure 10 cmHg) yields an ethanol permeate concentration of about 90%, but a pressure ratio of 4.6 (permeate pressure 5 cmHg) yields an ethanol permeate concentration of 96%. By doubling the pressure ratio, the water content of the permeate is reduced by more than one half. A similar effect for water enrichment is observed for water-selective membranes ($\alpha_{mem}<1$).

The extent of these effects, particularly with separation performance, has not been apparent previously because industrial-scale modules with membranes permitting permeate vapor flows greater than 100 L of vapor/m².h, 500 L of vapor/m².h or 1,000 L/m².h were not made. When modules containing high-flux, high-separation membranes, and operating at low pressure, are made, it is seen that the permeate channel pressure drop, and consequent diminished transmembrane pressure ratio, can give rise to serious problems, with separation as well as flux. These problems cannot be solved simply by making the permeate spacer very porous and very thick, because the thicker the permeate spacer, the less space will be available in the module for membrane. As the membrane area of the module decreases, the total permeate flow that can be drawn through the module will also decrease. Also, very porous spacers may not adequately support the membrane layer, and very coarse materials may damage the membrane surface when the transmembrane pressure differential is applied.

A key property influencing the utility of a particular permeate spacer material is its resistance to permeate vapor flow, which is characterized by the permeate channel pressure drop, in cmHg, for a given permeate vapor flow, in L(STP)/h. The inverse relationship, that is, the permeate vapor flow in L(STP)/h per cmHg permeate channel pressure drop, expresses the conductivity of the spacer material. This parameter is determined by measuring the flow per unit pressure drop through a sheet of spacer material of the same dimensions as the spacer to be used in the proposed membrane envelope. A number of methods of measuring this parameter could be used; one that we have found advantageous is as follows:

1. A sheet of spacer material to be tested, having the same dimensions as the proposed membrane envelope, is wound around a rod or pipe. An impermeable outer covering is then wound over the spacer as an overwrap.
2. The wrapped wound spacer is then placed inside a PVC tube and manifold to allow air to be drawn through the spacer wrap.
3. One end of the tube is connected to a vacuum pump, where a low pressure is maintained. We use 5 cmHg. The pressure at the other end of the tube can be varied by means of a valve. In this way the air flow through the wound material can be determined as a function of pressure drop from one end of the wound spacer to the other end held at 5 cmHg.
4. The air flow rate in L(STP)/h is plotted as a function of the pressure drop in cmHg. The slope of this line is called the conductuvuty and has the dimensions L(STP)/h.cmHg.

The conductivity is a measure of the ability of the spacer to transmit the permeate vapor from the end of the membrane envelope to the central collection pipe in a spiral-wound module. In the conductivity experiments, therefore, a spacer of the same dimensions of length, width and thickness to that which is to be employed in making the module is used. The spacer is wound around the rod at 90° to the way in which it would be rolled in a module. The edge of the spacer that would be adjacent to the permeate collection tube in the module is at the end of the tube connected to the vacuum pump. Thus the flow of air in the conductivity measurements is in the same direction as the flow of permeate vapor would be in a spiral-wound pervaporation module.

The higher the membrane flux, the higher is the conductivity that is required from the permeate spacer, because a higher transmembrane flux potentially produces a greater flow of vapor through the permeate channel. For any membrane and module, the flux-normalized conductivity can be obtained by dividing the conductivity by the average permeate vapor flux in L (STP) of vapor/m².h. We have found that, for spiral-wound pervaporation modules, the normalized conductivity should be not less than about 0.2 m²/cmHg and not more than about 4 m²/cmHg, more preferably should be not less than about 0.3 m²/cmHg and not more than about 3 m²/cmHg, and most preferably should be not less than about 0.5 m²/cmHg and not more than about 2 m²/cmHg.

The thickness of the spacer is an important component of the permeate spacer conductivity. It has previously been generally considered in the module making art that, when other requirements are satisfied, the spacer material should be as thin as possible, so that the membrane area that can be contained in the module is kept high. This is a simple, but effective, rule of thumb with reverse osmosis and other high pressure separations, where any pressure drop along the permeate channel is small compared to the total transmembrane pressure drop. However, our examples demonstrate that, in pervaporation, for a given membrane wound into a module, the module throughput at first increases with increasing permeate spacer thickness, reaches a maximum at a certain thickness, and then declines. To our knowledge, this behavior has not been demonstrated before.

The throughput begins to decline at a certain spacer thickness, even though the flux, that is the permeate volume per unit membrane area, may still be increasing at that spacer thickness, because loss of membrane area becomes the dominating factor in the module performance. A plot of throughput against permeate spacer thickness can be made and used to determine the spacer thickness necessary to maintain the throughput at maximum, or any chosen percentage, such as 60%, 70%, 80% or 90% of maximum. By following this teaching, it is possible to use spacers that would previously have been considered unacceptably thick, and yet obtain a desired performance from the module.

Another property that affects the conductivity is the spacer porosity. An open structure, consistent with the support function, is desirable for the permeate spacer. The use of a strong membrane support web, as described below, enables a more open spacer than would otherwise be possible to be used, since the two act in combination to resist membrane deformation. The types of material that we have found to be suitable for the permeate spacer are open nettings with a porosity of at least 50%, preferably at least 60% and most preferably at least 75%, as defined by the ratio of the free space to the strand area in a cross-section of the spacer. Materials that may be used for the permeate spacer include Aquaculture, Bemis or Vexar types of nettings.

The total resistance along the permeate channel also depends on the channel length. It is desirable, therefore, to make the permeate channel length as short as possible. This may be achieved by incorporating more than one membrane envelope in the module. For example, three, four, six or more envelopes may be wound together, separated by permeate spacers, around the permeate collection pipe. Modules with many extremely short membrane envelopes are difficult to make. The length of any one membrane envelope should preferably not exceed about 2.5 meters, and, more typically, will be not less than about 0.5 m nor greater than about 2 m.

A number of permeate spacer configurations are possible. For example, the permeate spacer may comprise two or more similar or dissimilar layers. The layers in contact with the membrane surface or the membrane support surface may be relatively fine and dense, for instance, while a central layer of very coarse, open material is used. It is also possible to use permeate spacer layers of non-uniform thickness in the direction of the permeate flow, so that the permeate channel becomes thicker as the permeate collection pipe is approached. The overall thickness of the spacer layer that is calculated in accordance with the invention, to give a desired module throughput, is expected to be not less than a minimum of about 20 mils, more probably not less than about 40 mils, and most probably not less than about 50 mils, for the pervaporation membranes that are currently known. Likewise the spacer thickness is expected to be in the range about 20–500 mils, more probably 40–300 mils, and most probably about 50–150 mils, for the pervaporation membranes that are currently known. Spacers with thicknesses below about 40 mils are less preferred and their use is not expected to yield optimized modules with high throughputs.

The permeate spacer is tailored in accordance with the teachings of the invention, with dimensions and conductivity appropriate to obtain a total permeate flow throughput within any desired percentage of the maximum possible throughput with that membrane/module configuration. When this is done, the pressure drop along the permeate channel should preferably be less than 40% of the total pressure drop that can be generated between feed and permeate sides of the unit; more preferably it should be less than 20%. The pressure drop along the permeate channel should preferably be less than 10 cmHg, more preferably less than 5 cmHg, even when the total feed/permeate vapor pressure difference is as high as 100 cmHg or more, because of the impact of pressure ratio on separation performance.

The membrane used in the invention may take the form of a homogeneous membrane, an asymmetric membrane, a composite membrane or any other form known in the art. Preferred embodiments of the invention employ a multilayer membrane comprising a microporous substrate membrane on a support web, with an ultrathin layer of the permselective polymer coated onto the microporous substrate. A preferred substrate is an asymmetric Loeb-Sourirajan type membrane, which consists of a relatively open, porous substrate with a thin, dense, finely porous skin layer. Materials that can be used for the permselective layer, depending on the separation to be performed, include, for example, silicone rubber, chlorosulfonated polyethylene, polysilicone-carbonate copolymers, fluoroelastomers, plasticized polyvinylchloride, polyurethane, polybutadiene, polystyrene-butadiene copolymers, styrene-butadiene/styrene block copolymers, polyacetylene, polyether/polyamide block copolymers, polymethylpentene, ethylcellulose, cellulose acetate and the like. The permselective layer may be deposited on the substrate membrane by solution coating, a technique known in the art and described, for example, in U.S. Pat. Nos. 4,553,983 or 4,243,701. The finished thickness of the permselective layer should preferably be less than about 10 microns, more preferably less than about 5 microns. Because the permselective layer is so thin, very high permeate vapor fluxes can be obtained, typically above 100 L(STP)/m².h or 500 L(STP)/m².h, and frequently above 1,000 or 2,000 L(STP)/m².h. When the permeate vapor is condensed, these translate to liquid fluxes of from 0.1 kg/m².h to 2 kg/m².h.

The support membrane is preferably reinforced by casting it on a web, which serves both as a carrier for the microporous substrate membrane, and as a support material that acts in conjunction with the permeate spacer to retain the shape of the membrane against the operating pressure of the system. The web material should be strong enough to resist intrusion of the membrane and web into the interstices of the permeate spacer under the hydrostatic pressure between the feed and permeate sides of the membrane. Materials with a Mullen busting strength of at least 30 lb/in, such as strong grades of polyester paper or fabric, are preferred.

The feed spacer is used to keep the inside surfaces of the membrane envelope apart, and thus to create a channel down which the feed gas or liquid flows. A relatively open mesh material, for example with about 4-10 mesh strands per inch, is preferable.

Modules in accordance with the invention may be designed and made for any given membrane by selecting a high-porosity spacer, choosing membrane envelope dimensions consistent with manufacturing capability, then determining the required thickness of spacer by generating a module throughput versus permeate spacer thickness curve, such as those in Examples 4 and 7. The conductivity of any spacer material may be determined by carrying out an experiment such as that of Example 8 to measure the air flow/unit pressure drop that characterizes that spacer.

Figure 2:
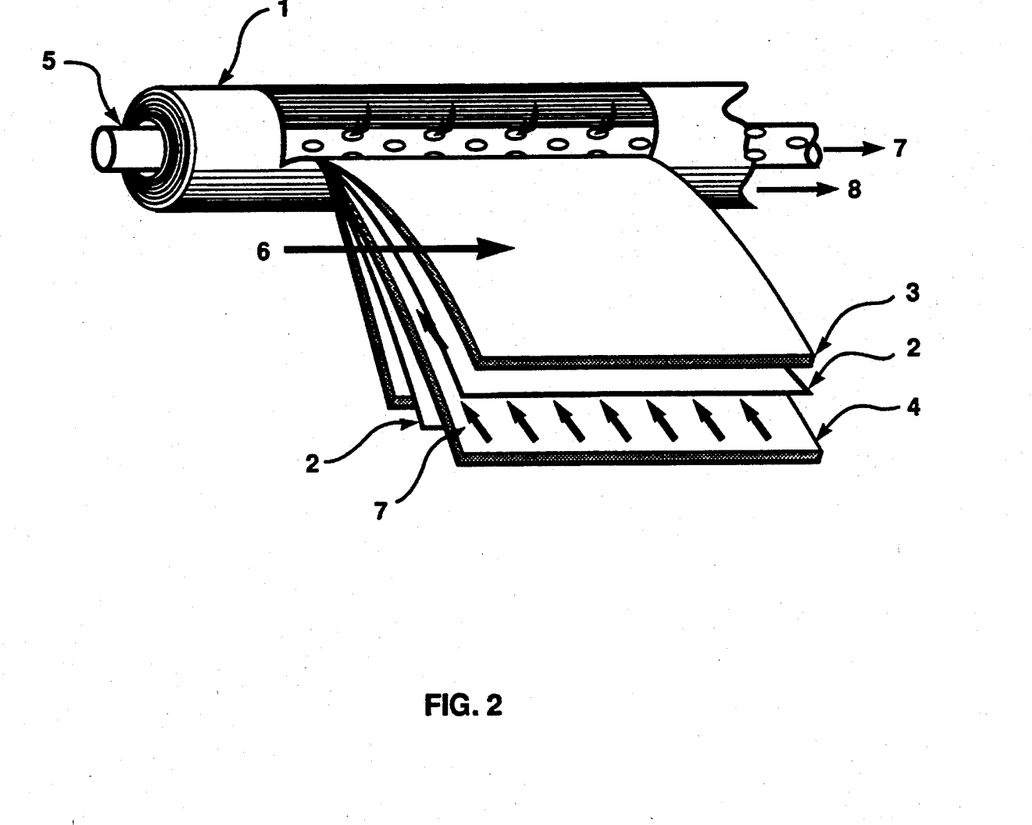
FIG. 2 is a schematic drawing of a membrane module.

When the module design has been established in accordance with the teachings described above, the module may be assembled using any of the methods for making spiral-wound modules known in the art. FIG. 2 shows a typical spiral-wound module cut open to reveal the arrangement of spacers and membranes. Referring now to this figure, lengths of membrane, 2, are prepared and folded to form the membrane envelopes. The feed spacer, 3, is inserted between the envelope facing surfaces. The envelopes are separated from one another by the permeate spacer layers, 4. The permeate spacer and membrane envelope layers are wound up around the central permeate collection pipe, 5. Glue is used to seal the ends and edges of the module, and to ensure that there is no vapor-transferring communication between the feed and permeate sides of the membrane, except through the membrane. When the module is completely wound, it is covered with a layer of fabric-reinforced tape to seal it. The modules may be housed singly or multiply in a fiberglass, plastic or metal shell, 1. The directions of feed, residue and permeate flows are indicated by arrows 6, 8 and 7 respectively. References that teach the assembly of modules include S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977, U.S. Pat. Nos. 3,367,504 and '505, and 3,386,583, all to Gulf General Atomic Corporation, 4,137,113 to Toray Industries, 4,500,426 to Daicel Chemical, 4,476,022 to Doll, 4,789,480, to Brüschke, 4,792,401, to Koch Membrane Systems and 4,802,982, to Desalination Systems. Numerous other patents and publications are available describing spiral-wound modules of various designs, wherein the modes of entry and exit of the several fluid streams, or the directions of their flow within the module, are different from those shown in FIG. 2. As just one example, the feed may flow radially and the permeate axially. It should be understood that FIG. 2 is intended to illustrate the design of a typical module, but that spiral-wound modules of all types can be designed and made in accordance with the teachings, and within the scope, of the invention.

The modules of the invention may typically be used by running the feedstream to be treated over the feed side of the membrane, so that the feed flows axially down the module from end to end. The permeating components enter the permeate channel and are drawn spirally inward to the central collection pipe, through which the permeate stream exits the module. A low pressure on the permeate side of the system, and thus the membrane, can be maintained by a vacuum pump, or by condensing the permeate. Typically the permeate-side pressure is low compared with atmospheric, such as 20 cmHg, 15 cmHg, 10 cmHg or 5 cmHg.

Modules made according to the above teachings of permeate spacer porosity, support web strength, permeate channel length and optimized permeate spacer thickness exhibit improved performance compared with other modules using conventional or non-optimized spacers. An unexpected and valuable feature of the modules of the invention is their ability to match and exceed the loss of total permeate throughput brought about by decreased membrane area. A module with a relatively thick permeate spacer will have less space within the same volume for the membrane coil than will one with a thinner spacer. Therefore the use of a thicker spacer results in a lower packing density within a module of given size, and hence a smaller membrane area available for the separation process. Thus, it would be expected that the total amount of permeate produced by the module would decrease in proportion to the decrease in membrane area. However, we have found with our modules that the flux is so improved that the total permeate throughput of the module is as good or substantially better than that obtained with a module with non-optimized spacers containing up to about 40% greater membrane area. A module with the improved system design, incorporating the same membrane area as an unimproved module, could produce two or more times the amount of permeate per hour than the unimproved module.

The invention is now further described in Examples 1 to 10, which are intended to illustrate the invention without limiting it scope in any way.

EXAMPLES

EXAMPLE 1

A multilayer composite membrane was prepared by casting an asymmetric membrane on a support web of non-woven polyester. A thin permselective layer was dip-coated onto the asymmetric support. Three membrane envelopes were prepared. Sheets 175 cm long were cut and folded to form envelopes having one side 91 cm long and the other 84 cm long. A sheet of 32-mil thick Vexar netting, with a porosity measured as the ratio of space between strands to strand density of about 70%, was used for both the feed and permeate spacers. Three membrane envelopes, separated by single layers of permeate spacer, were wound up round the permeate pipe. The wound module was encased in fabric-reinforced tape and housed in a PVC housing with PVC end caps. The module had a finished membrane area of 3.7 m$^2$, and an outside diameter of 4 inches. The module performance was tested with in a pervaporation experiment, using water as the feedstream and lowering the pressure on the permeate side by means of a condenser and a vacuum pump. The experiment was repeated for three different water temperatures and permeate pressures. The results are summarized in Table 1. In this table, the term permeate pressure refers to the pressure measured between the membrane module and the vacuum pump. The permeate pressure inside the module underneath the membrane is higher, and hence the transmembrane pressure drop is lower than that indicated by the table, because of the parasitic pressure drop within the module along the permeate channel.

TABLE 1

| Spacer Thickness (mils) | Membrane Area ($m^2$) | Feed Temperature (°C.) | Feed Pressure (cmHg) | Permeate Pressure (Torr) | Permeate Flux (kg/$m^2$.h) | Module Throughput (kg/h) |
|---|---|---|---|---|---|---|
| 32 | 3.7 | 25 | 2.4 | 10 | 0.07 | 0.26 |
| 32 | 3.7 | 35 | 4.1 | 20 | 0.15 | 0.56 |
| 32 | 3.7 | 45 | 7.2 | 30 | 0.23 | 0.86 |

As can be seen from the Table, the permeate flux and hence total permeate throughout depends on the pressure difference and the operating temperature.

EXAMPLE 2

The experiment of Example 1 was repeated. In this case, the module incorporated three envelopes cut from sheets 150 cm long and folded to have sides 77 cm and 73 cm long. The feed spacer was Vexar as before, and the permeate spacer was 62.5-mil thick Bemis net. The module was taped and encased as before. The module had a finished area of 2.85 $m^2$, and a diameter as before of 4 inches.

The same pervaporation experiment as in Example 1, using the same operating parameters, was performed. The results are summarized in Table 2.

TABLE 2

| Spacer Thickness (mils) | Membrane Area ($m^2$) | Feed Temperature (°C.) | Feed Pressure (cmHg) | Permeate Pressure (Torr) | Permeate Flux (kg/$m^2$.h) | Module Throughput (kg/h) |
|---|---|---|---|---|---|---|
| 62.5 | 2.85 | 25 | 2.4 | 10 | 0.19 | 0.54 |
| 62.5 | 2.85 | 35 | 4.1 | 20 | 0.345 | 0.98 |
| 62.5 | 2.85 | 45 | 7.2 | 30 | 0.535 | 1.52 |

As can be seen by comparing these results with those of Example 1, the permeate flux under comparable operating conditions more than doubled when the relatively thin spacer material was replaced by the thicker spacer. The effect was most noticeable at the lowest operating temperature, where the maximum pressure drop between the feed and permeate sides can only be 1.4 cmHg, and where the effects of pressure losses are therefore more significant.

Comparison of the module throughput for the two examples shows that the total throughput was also about twice as great for the module with the thicker spacer, although the membrane area contained within the module was reduced from 3.7 $m^2$ to 2.85 $m^2$, a reduction of about 23%.

EXAMPLE 3

The experiment of Example 1 was repeated. In this case, the module incorporated two envelopes cut from sheets 150 cm long and folded to have sides 77 cm and 73 cm long. The feed spacer was Vexar as before, and the permeate spacer was 62.5-mil thick Bemis net. Two layers were used, to create a total permeate spacer thickness of 125 mils. The module was taped and encased as before. The module had a finished area of 2.0 $m^2$, and a diameter of 4 inches.

The same pervaporation experiment as in Example 1, using the same operating parameters, was performed. The results are summarized in Table 3.

TABLE 3

| Spacer Thickness (mils) | Membrane Area ($m^2$) | Feed Temperature (°C.) | Feed Pressure (cmHg) | Permeate Pressure (Torr) | Permeate Flux (kg/$m^2$.h) | Module Throughput (kg/h) |
|---|---|---|---|---|---|---|
| 125 | 2.0 | 25 | 2.4 | 10 | 0.24 | 0.48 |
| 125 | 2.0 | 35 | 4.1 | 20 | 0.42 | 0.84 |
| 125 | 2.0 | 45 | 7.2 | 30 | 0.69 | 1.40 |

Comparison of flux and throughput results with those of Example 1 shows that the fluxes obtained were now about three times higher than those obtained with the thinner spacer. As before, the effect of the thicker spacer was most pronounced where the pressure difference between feed and permeate sides of the membrane was lowest. In this case, flux was improved 3.4 times by use of the thick spacer. The throughput obtained was also about 1.5–1.8 times that achieved with the module of Example 1, although the membrane area decreased from 3.7 $m^2$ to 2.0 $m^2$, a decrease of 46%. The throughputs obtained in this case are, however, slightly lower than those obtained with the single layer of Bemis net used for Example 2.

EXAMPLE 4

Figure 3:
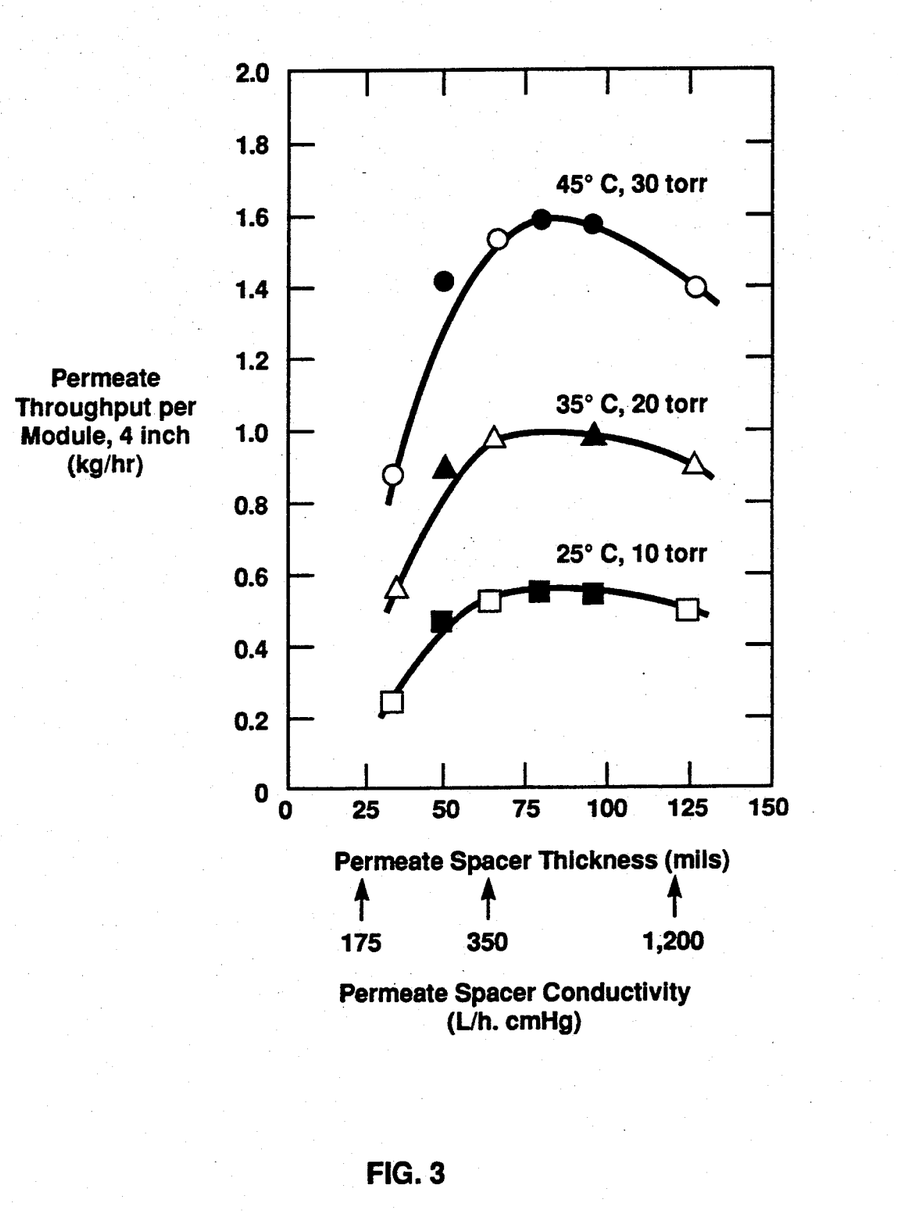
FIG. 3 is a graph of total permeate throughput per module against permeate spacer thickness for a 4-inch module operating at various temperatures and pressures.

The experimental results generated in Examples 1, 2 and 3, were used to extrapolate values for the throughput obtainable with spacers of thickness 47 mils, 78 mils and 94 mils. The results were plotted with the experimental data as a graph of module throughput per hour against permeate spacer thickness. FIG. 3 shows the curves for the three sets of operating conditions. As can be seen, the curves all pass through a maximum at about 75–80 mils spacer thickness. We call this region the maximum possible permeate flow throughput. There is an optimum spacer thickness of about 50–120 mils such that the module throughput is sustained at about 90% of its maximum value. When spacers thicker than those in this optimum range are used, the permeate flux may continue to increase, but the module throughput begins to be affected by the much reduced membrane area in the module.

EXAMPLE 5

The experiment of Example 1 was repeated. In this case, the module incorporated nine envelopes cut from membrane sheets 212 cm long. The feed spacer was Vexar as before, and the permeate spacer was 62.5-mil thick Bemis net. The module was taped and encased as before. The module had a finished area of 7.6 $m^2$, and a diameter of 6 inches.

A pervaporation experiment as in Example 1 was performed. The experiment was carried out at feed temperatures of 48° C. and 58° C., and a vacuum pump was used to reduce the permeate stream pressure to 20 torr. The results are summarized in Table 4.

TABLE 4

| Spacer Thickness (mils) | Membrane Area ($m^2$) | Feed Temperature (°C.) | Feed Pressure (cmHg) | Permeate Pressure (Torr) | Permeate Flux (kg/$m^2$.h) | Module Throughput (L/h) |
|---|---|---|---|---|---|---|
| 62.5 | 7.6 | 48 | 8.4 | 20 | 0.48 | 3.65 |
| 62.5 | 7.6 | 58 | 13.6 | 20 | 0.88 | 6.69 |

As in Example 1, a higher feed temperature, and hence greater pressure difference between feed and permeate sides, resulted in higher permeate flux.

EXAMPLE 6

The experiment of Example 5 was repeated. The feed spacer material and the envelope length were the same as in the previous example. The permeate spacer was two layers of Bemis net, with a total thickness of 125 mils. Six envelopes were incorporated into a module. The module was taped and encased as before. The module had a finished area of 5.0 $m^2$, and a diameter of 6 inches.

A pervaporation experiment as in Example 1 was performed. The experiment was carried out at feed temperatures of 48° C. and 58° C., and a vacuum pump was used to reduce the permeate stream pressure to 20 torr. The results are summarized in Table 5.

TABLE 5

| Spacer Thickness (mils) | Membrane Area ($m^2$) | Feed Temperature (°C.) | Feed Pressure (cmHg) | Permeate Pressure (Torr) | Permeate Flux (kg/$m^2$.h) | Module Throughput (kg/h) |
|---|---|---|---|---|---|---|
| 125 | 5.0 | 48 | 8.4 | 20 | 1.3 | 6.50 |
| 125 | 5.0 | 58 | 13.6 | 20 | 1.3 | 8.0 |

Comparing Tables 4 and 5, the permeate flux doubled when the thicker spacer was used in the 58° C. experiment. The total module throughput was 1.2 times greater, although the membrane area was 34% smaller. In the 48° C. experiment, the flux was 2.7 times greater with the thicker spacer. The total throughput of the module was about 1.8 times greater with the thicker spacer, although the membrane area was smaller by 34%. As before, the effects of the optimized spacers were most noticeable with lower feed pressures, and the increase in throughput created by the improved spacer more than compensated for the loss brought about by the reduced membrane area.

EXAMPLE 7

Figure 4:
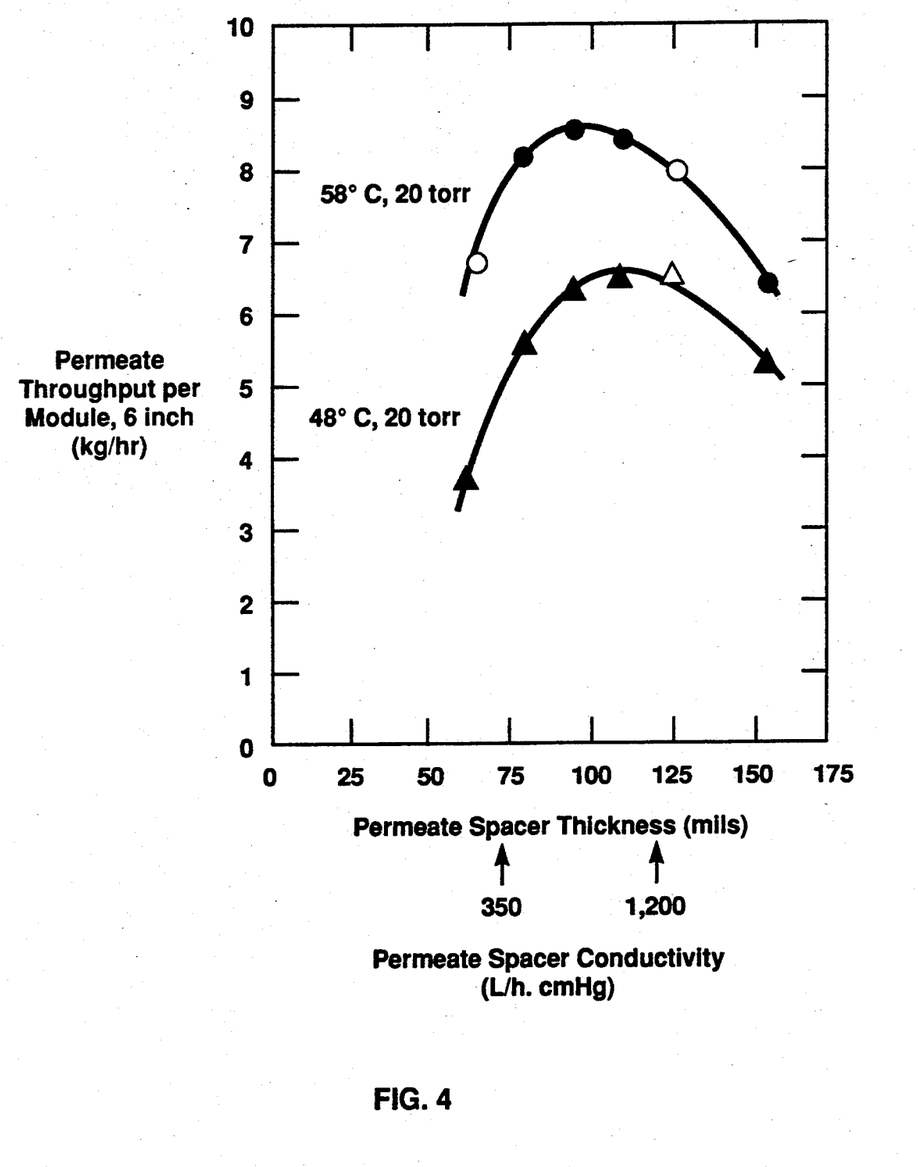
FIG. 4 is a graph of total permeate throughput per module against permeate spacer thickness for a 6-inch module operating at various temperatures and pressures.

The experimental results generated in Examples 5 and 6 were used to extrapolate values for the throughput obtainable with spacers of thickness 78 mils, 94 mils, 109 mils and 156 mils. The results were plotted with the experimental data as a graph of module throughput per hour against permeate spacer thickness. FIG. 4 shows the curves for the two sets of operating conditions. As with the smaller modules, the curves all pass through a maximum, in this case at about 95-110 mils spacer thickness. There is an optimum spacer thickness of about 70-140 mils such that the module throughput is sustained at about 90% of its maximum value. When spacers thicker than those in this optimum range are used, the permeate flux may continue to increase, but the module throughput begins to be compromised by the much reduced membrane area in the module.

EXAMPLE 8

In this experiment, the permeate spacer flow resistance of materials used in Examples 1-7 was measured.

Each spacer material was wound around a rod and placed inside a sealed tube. The area of the spacer material wound around the rod was about 1 m by 1 m in each case. Air was drawn through the spacer material by means of a vacuum pump connected to one end of the tube, where a pressure of 5 cmHg was maintained. The pressure at the other end of the tube could be varied by opening a valve. The air flow through the spacer material varied as a function of the pressure difference across the spacer. This experiment thus models the flow of vapor through the permeate spacer material during pervaporation. The data obtained are shown in FIG. 5.

Figure 5:
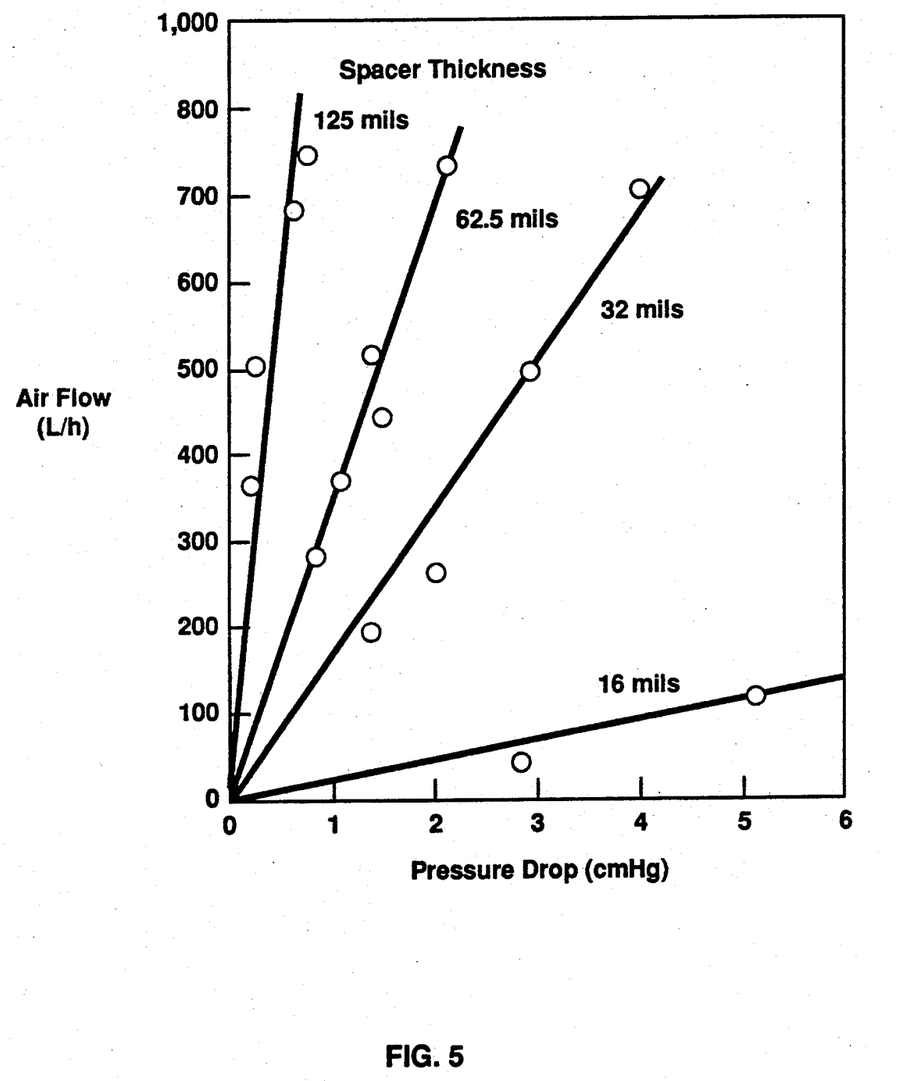
FIG. 5 is a graph of air flow as a function of pressure drop for a 1 m$^2$ of spacer material wound around a tube.

For each spacer material, the slope of the line in FIG. 5 gives the air flow in L/h per unit pressure drop in the spacer, and is a measure of the conductivity of the spacer. The slopes for the various spacer materials are shown in Table 6.

TABLE 6

| Flow/unit pressure drop measured with 1 $m^2$ samples of spacer materials. | |
|---|---|
| Spacer Type | Air flow (L/h.cmHg) |
| 16-mil Tricot | 25 |
| 32-mil Vexar | 175 |
| 62.5-mil Bemis | 350 |
| 125-mil Bemis | 1,200 |

These conductivity figures are also shown on the ordinate of the module performance graphs, FIGS. 3 and 4.

From an inspection of these figures, it follows that the optimum conductivity for the data in FIG. 3, where the average permeate flux is 0.2-0.5 kg/$m^2$.h or 150-650 L (vapor)/$m^2$.h, is between 200 and 1,400 L/h.cmHg. From the data in FIG. 4, where the average permeate flow is 0.5-1.3 kg/$m^2$.h or 650-1,700 L (vapor)/$m^2$.h, the optimum conductivity is between 300 and 1,500 L/h.cmHg. A higher conductivity is required when the membrane flux increases, because this produces a greater flow of vapor through the permeate spacer channel. The conductivity can be normalized with respect to membrane flux by dividing the conductivity by the average permeate vapor flux. The optimum normalized spacer conductivity for the spacer materials of FIG. 5 is then between about 0.5 and 4 m$^2$/cmHg; for the materials of FIG. 6 it is between about 0.2 and 1.5 m$^2$/cmHg.

EXAMPLE 9

Experimental performance data were compared with the calculated curves of FIG. 1. The comparison is plotted in FIG. 6. The data points on the heavy line were obtained from results published by GFT, West Germany for their polyvinylalcohol composite membrane, which has a water/ethanol selectivity of approximately 20. Because the membrane is extremely selective, its performance can be seen to be affected dramatically by the pressure ratio.

Figure 6:
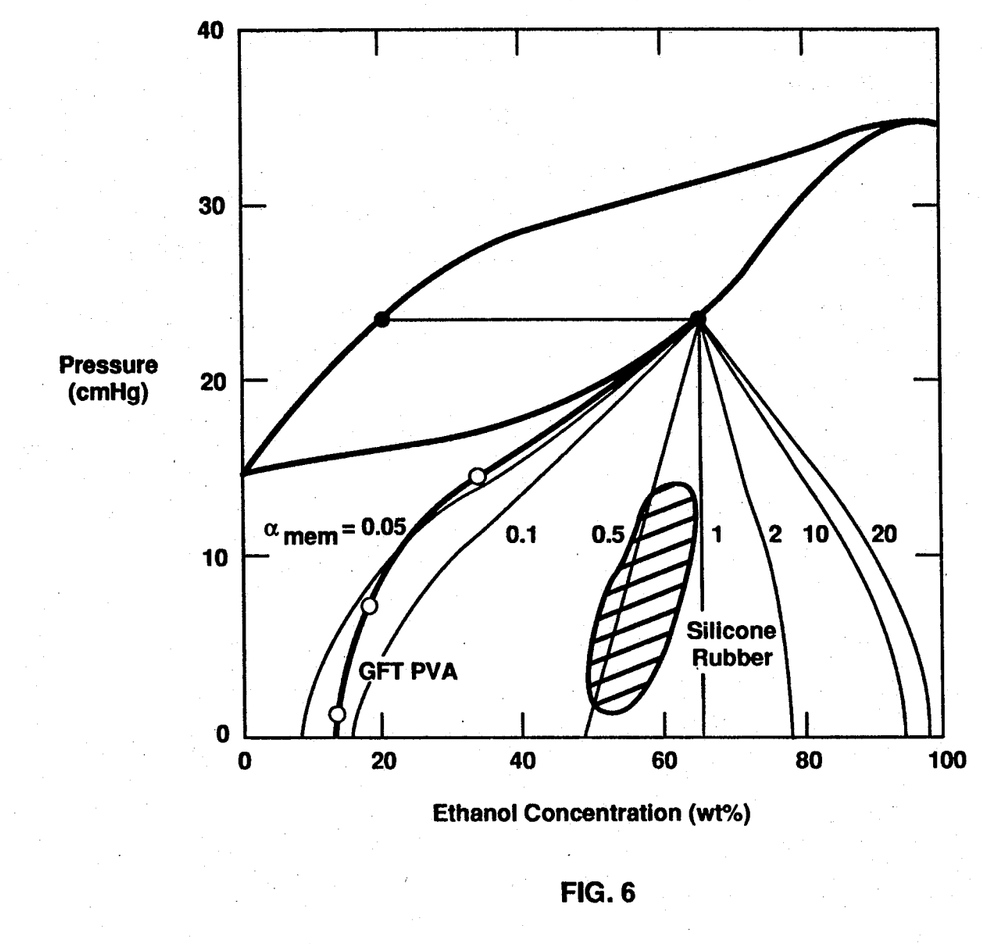
FIG. 6 is a graph comparing calculated permeate pressure versus permeate concentration curves for pervaporative separation of a feed liquid containing 20% ethanol in water with data obtained using very water-selective, and relatively unselective, membranes.

Experimental data taken from the Blume et al. paper for silicone rubber all fell within the shaded lozenge in FIG. 6. As shown, the permeate pressure and pressure ratio had a relatively small effect on the separation performance in this case, because silicone rubber is relatively unselective for water over ethanol.

These data show that the effect of pressure ratio on separation performance is slight if the membrane selectivity for the faster over the slower permeating component is less than about 2, but becomes very important if the selectivity is greater than about 10, and more important if the selectivity is greater than about 20. The data in FIG. 6 indicate that, for membranes with a selectivity greater than about 2, the pressure ratio should also be greater than 2, preferably greater than about 5, and ideally greater than about 10, to achieve the full benefit of the separation that can be performed by the membrane.

EXAMPLE 10

Figure 7:
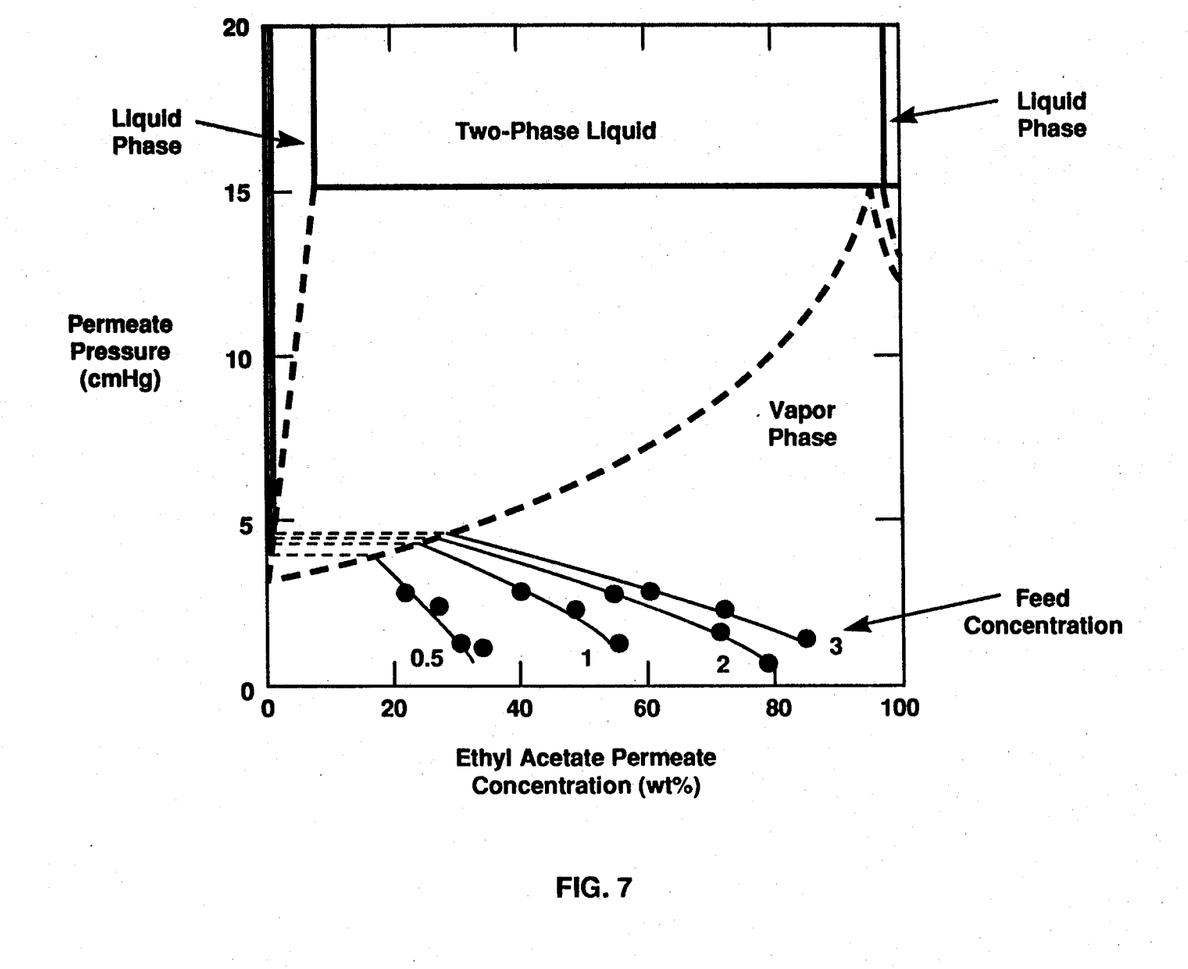
FIG. 7 is a graph showing the separation of ethyl acetate from feed solutions containing 0.5%, 1%, 2% and 3% ethyl acetate in water at 30° C., as a function of permeate pressure.

A small spiral-wound membrane module, having a membrane area of 0.2 m$^2$, was prepared. The module was used to perform pervaporation experiments with 0.5%, 1%, 2% and 3% solutions of ethyl acetate in water. The experimental data fit the assumption that the membrane had an $\alpha_{mem}$ of 20 for ethyl acetate over water. The results are plotted in FIG. 7. For example, a feed solution of 3% ethyl acetate in water has a total vapor pressure of approximately 4.5 cmHg. When the permeate pressure was maintained at 3 cmHg, the permeate ethyl acetate concentration was 60%. This represents a 20-fold enrichment compared with the feed. When the permeate pressure was maintained at 1 cmHg, the enrichment was increased to almost 90% ethyl acetate. The results clearly show the effect of permeate pressure on the separation that can be obtained.

We claim:

1. A spiral-wound pervaporation module, comprising:
    a membrane layer, having a feed side and a permeate side;
    a feed spacer layer, placed generally contiguous with and parallel to said membrane layer on said feed side;
    a permeate spacer layer, placed generally contiguous with and parallel to said membrane layer on said permeate side; said permeate spacer having a conductivity, normalized for membrane flux, that provides a permeate flow throughput, when the module is in use for pervaporation, of at least 60% of the maximum possible permeate flow throughput.

2. The module of claim 1, wherein said membrane layer has a permeate vapor flux of at least 100 L (vapor STP)/m$^2$.h.

3. The module of claim 1, wherein said membrane layer has a permeate vapor flux of at least 500 L (vapor STP)/m$^2$.h.

4. The module of claim 1, wherein said membrane layer has a selectivity $\alpha_{mem}$, expressed as the ratio of the membrane permeabilities of a faster permeating component to a slower permeating component, of at least 2.

5. The module of claim 1, wherein said membrane layer has a selectivity $\alpha_{mem}$, expressed as the ratio of the membrane permeabilities of a faster permeating component to a slower permeating component, of at least 10.

6. The module of claim 1, wherein said membrane layer comprises a composite membrane, having a microporous support membrane coated with a thin permselective layer.

7. The module of claim 1, wherein said conductivity, normalized for membrane flux, is in the range 0.2-4 m$^2$/cmHg.

8. The module of claim 1, wherein said conductivity, normalized for membrane flux, is in the range 0.3-3 m$^2$/cmHg.

9. The module of claim 1, wherein said conductivity, normalized for membrane flux, is in the range 0.5-2 m$^2$/cmHg.

10. The module of claim 1, wherein said permeate spacer layer has a thickness of at least 20 mils.

11. The module of claim 1, wherein said permeate spacer layer has a thickness of at least 40 mils.

12. The module of claim 1, wherein said permeate spacer layer has a thickness of at least 50 mils.

13. The module of claim 1, wherein said permeate spacer layer has a thickness in the range 20-500 mils.

14. The module of claim 1, wherein said permeate spacer layer has a thickness in the range 40-300 mils.

15. The module of claim 1, wherein said permeate spacer layer has a thickness in the range 50-150 mils.

16. The module of claim 1, wherein said permeate spacer layer comprises a multiplicity of layers of like material.

17. The module of claim 1, wherein said permeate spacer layer comprises a multiplicity of layers of unlike material.

18. The module of claim 1, wherein said permeate spacer layer thickness varies along a permeate channel.

19. The module of claim 1, wherein said permeate flow throughput is at least 70% of the maximum possible permeate flow throughput.

20. The module of claim 1, wherein said permeate flow throughput is at least 80% of the maximum possible permeate flow throughput.

21. The module of claim 1, wherein said permeate flow throughput is at least 90% of the maximum possible permeate flow throughput.

22. A pervaporation process, comprising:
    providing a spiral-wound module, said module comprising:
        a membrane layer, having a feed side and a permeate side;
        a feed spacer layer, placed generally contiguous with and parallel to said membrane layer on said feed side;

a permeate spacer layer, placed generally contiguous with and parallel to said membrane layer on said permeate side;

a permeate collection pipe, around which said layers are spirally wound;

contacting said feed side with a feed liquid containing a first component and a second component;

withdrawing from said permeate collection pipe a permeate flow throughput enriched in said first component compared with said feed liquid, wherein said permeate flow is at least 60% of the maximum possible permeate flow throughput.

23. The process of claim 22, wherein said membrane layer has a permeate vapor flux of at least 100 L (vapor STP)/m$^2$.h.

24. The process of claim 22, wherein said membrane layer has a permeate vapor flux of at least 100 L (vapor STP)/m$^2$.h.

25. The process of claim 22, wherein said membrane layer has a selectivity $\alpha_{mem}$, expressed as the ratio of the membrane permeabilities of a faster permeating component to a slower permeating component, of at least 2.

26. The process of claim 22, wherein said membrane layer has a selectivity $\alpha_{mem}$, expressed as the ratio of the membrane permeabilities of a faster permeating component to a slower permeating component, of at least 10.

27. The process of claim 22, wherein said membrane layer comprises a composite membrane, having a microporous support membrane coated with a thin permselective layer.

28. The process of claim 22, wherein the total vapor pressure on said permeate side is less than 15 cmHg.

29. The process of claim 22, wherein said permeate spacer layer has a conductivity, normalized for membrane flux, in the range 0.2-4 m$^2$/cmHg.

30. The process of claim 22, wherein said permeate spacer layer has a conductivity, normalized for membrane flux, in the range 0.3-3 m$^2$/cmHg.

31. The process of claim 22, wherein said permeate spacer layer has a conductivity, normalized for membrane flux, in the range 0.5-2 m$^2$/cmHg.

32. The process of claim 22, wherein said permeate spacer layer has a thickness of at least 20 mils.

33. The process of claim 22, wherein said permeate spacer layer has a thickness of at least 40 mils.

34. The process of claim 22, wherein said permeate spacer layer has a thickness of at least 50 mils.

35. The process of claim 22, wherein said permeate spacer layer has a thickness in the range 20-500 mils.

36. The process of claim 22, wherein said permeate spacer layer has a thickness in the range 40-300 mils.

37. The process of claim 22, wherein said permeate spacer layer has a thickness in the range 50-150 mils.

38. The process of claim 22, wherein said permeate spacer layer comprises a multiplicity of layers of like material.

39. The process of claim 22, wherein said permeate spacer layer comprises a multiplicity of layers of unlike material.

40. The process of claim 22, wherein said permeate spacer layer thickness varies along a permeate channel.

41. The process of claim 22, wherein said permeate flow throughput is at least 70% of the maximum possible permeate flow throughput.

42. The process of claim 22, wherein said permeate flow throughput is at least 80% of the maximum possible permeate flow throughput.

43. The process of claim 22, wherein said permeate flow throughput is at least 90% of the maximum possible permeate flow throughput.

* * * * *